US009148246B2

(12) United States Patent
Pointurier et al.

(10) Patent No.: US 9,148,246 B2
(45) Date of Patent: Sep. 29, 2015

(54) TRANSPONDER AND RELATED NETWORK NODE FOR AN OPTICAL TRANSMISSION NETWORK

(75) Inventors: Yvan Pointurier, Massy (FR); Christian Dorize, Le Mesnil St Denis (FR); Annalisa Morea, Villebon sur Yvette (FR)

(73) Assignee: Alcatel Lucent, Boulogne-Billancourt (FR)

( * ) Notice: Subject to any disclaimer, the term of this patent is extended or adjusted under 35 U.S.C. 154(b) by 169 days.

(21) Appl. No.: 13/882,569

(22) PCT Filed: Dec. 2, 2011

(86) PCT No.: PCT/EP2011/071671
§ 371 (c)(1),
(2), (4) Date: Apr. 30, 2013

(87) PCT Pub. No.: WO2012/076423
PCT Pub. Date: Jun. 14, 2012

(65) Prior Publication Data
US 2013/0243431 A1    Sep. 19, 2013

(30) Foreign Application Priority Data
Dec. 6, 2010    (EP) .................................. 10306356

(51) Int. Cl.
H04J 14/02 (2006.01)
H04B 10/29 (2013.01)
H04Q 11/00 (2006.01)

(52) U.S. Cl.
CPC ............ H04J 14/0212 (2013.01); H04B 10/29 (2013.01); H04Q 2011/0039 (2013.01)

(58) Field of Classification Search
CPC .............. H04Q 2011/0037–2011/0039; H04Q 2011/0043; H04Q 2011/0084
See application file for complete search history.

(56) References Cited

U.S. PATENT DOCUMENTS 7,123,806 B2 * 10/2006 Jahn et al. ..................... 385/134

2004/0071389 A1 * 4/2004 Hofmeister et al. ............ 385/16

(Continued)

FOREIGN PATENT DOCUMENTS

| EP | 2151931 | 2/2010 |
|---|---|---|
| JP | 2010-041602 | 2/2010 |
| WO | 2008101420 | 8/2008 |

OTHER PUBLICATIONS

Christian Dorize et al; An Energy-Efficient Node Interface for Optical Core Networks; Transparent Optical Networks (ICTON); 2010 12th International Conference On, IEEE; Piscataway, NJ; USA; Jun. 27, 2010; pp. 1-4; XP031733230; ISBN: 978-1-4244-7799-9.

(Continued)

*Primary Examiner* — David Payne
*Assistant Examiner* — Casey Kretzer
(74) *Attorney, Agent, or Firm* — Patti & Malvone Law Group, LLC

(57) ABSTRACT

In order to reduce power consumption in network equipment for optical transmission networks, it is proposed by reducing E/O conversion and signal processing in optical networks when not needed. A network node has two or more line cards. Each line card contains a receive side transponder section with a network side optical receiver, a first electrical section, and a client side optical transmitter and a transmit side transponder section with a network side optical transmitter, a second electrical section, and a client side optical receiver. The first electrical section has at least one intermediate electrical output the second electrical section has at least one intermediate electrical input. The intermediate electrical outputs and inputs lead to an electrical switch matrix, which controllably interconnects the intermediate electrical outputs and inputs. Preferably, the transponders can additionally contain second intermediate electrical outputs and inputs additionally bypassing a Forward-Error-Correction processing function in the line cards.

4 Claims, 3 Drawing Sheets

(56) References Cited

U.S. PATENT DOCUMENTS

| | | |
|---|---|---|
| 2006/0115275 A1 | 6/2006 | Kan et al. |
| 2007/0031153 A1* | 2/2007 | Aronson et al. ............ 398/138 |
| 2008/0062980 A1 | 3/2008 | Sunaga et al. |
| 2010/0034533 A1 | 2/2010 | Aono |

OTHER PUBLICATIONS

Gangxian Shen et al; Energy-Minimized Design for IP Over WDM Networks; IEEE/OSA Journal of Optical Communications and Networking; IEEE; USA; vol. 1, No. 1; Jun. 1, 2009; pp. 176-186; XP011262125; ISSN: 1943-0620.

Baliga, Jayant et al; Energy Consumption in Optical IP Networks; Journal of Lightwave Technology, IEEE Service Center, New York, NY; USA; vol. PP, No. 13; Jul. 1, 2009; pp. 2391-2403; XP011255762; ISSN: 0733-8724.

Edoardo Bonetto et al; Optical Technologies can Improve the Energy Efficiency of Networks; 35th European Conference on Optical Communication, 2009; ECOC '09, Vienna, Austria, IEEE, Piscataway, NJ, USA; Sep. 20, 2009; pp. 1-4; XP031546366; ISBN: 978-1-4244-5096-1.

* cited by examiner

TRANSPONDER AND RELATED NETWORK NODE FOR AN OPTICAL TRANSMISSION NETWORK

FIELD OF THE INVENTION

The present invention relates to the field of telecommunications and more particularly to a transponder and related network node for an optical transmission network.

BACKGROUND OF THE INVENTION

In telecommunications, high speed core networks mainly rely on optical transmission. Data signals can be modulated onto optical carriers at different wavelengths and transmitted together using wavelength division multiplexing over a same fiber span. In long-haul optical transmission, optical regenerators are provided along an optical transmission line to regenerate optical signals and remove distortions. Moreover, Forward Error Correction (FEC) processing can be applied to increase the maximum transmission distance per span and the receiver sensitivity.

With the introduction of wavelength selective switches (WSS) and reconfigurable optical add/drop multiplexers (ROADMs), optical transmission networks evolve from classical point-to-point transmission more and more towards optical switched network applications, so that transmission distances may be different for signals at different wavelength channels.

SUMMARY OF THE INVENTION

With the ever increasing amount of traffic and transmission rates, which requires high-speed electronic signal processing that in a first approximation follows Moore's law, power consumption becomes a limiting factor. It is hence an object of the present invention, to provide network equipment for optical transmission networks which can operate at a reduced power consumption. This is achieved according to an aspect of the invention by reducing E/O conversion and signal processing in optical networks when not needed. The present invention hence provides a network node and a transponder for such a network node, which flexibly allows to enable or disable O/E/O conversion and/or signal processing for individual optical signals as needed.

In particular, a transponder for an optical signal contains at least one optical receiver for receiving an optical line signal and converting it to an electrical signal; an electrical section for processing and/or reshaping the electrical signal; and an optical transmitter for converting the electrical signal back to an optical output signal. The electrical section contains at least one intermediate electrical output for configurably outputting the electrical signal prior to E/O conversion.

Such transponders can be used in a line card of an optical network node. The network node has two or more such line cards. Each line card contains a receive side transponder section with a network side optical receiver, a first electrical section, and a client side optical transmitter and a transmit side transponder section with a network side optical transmitter, a second electrical section, and a client side optical receiver. The first electrical section has at least one intermediate electrical output and the second electrical section has at least one intermediate electrical input. The intermediate electrical outputs and inputs lead to an electrical switch matrix, which controllably interconnects the intermediate electrical outputs and inputs.

The transponders in the line cards can additionally contain second intermediate electrical outputs and inputs additionally bypassing a Forward-Error-Correction processing function in the line cards.

A method of regenerating an optical signal has the steps of receiving said optical signal at a first transponder; converting said optical signal to an electrical signal; bypassing said electrical signal to a second transponder; and converting said electrical signal to an optical signal for onwards transmission.

The method can further contain the step of selecting between configuring a first bypass bypassing an electro-optical conversion in the first transponder and an opto-electrical conversion in the second transponder and configuring a second bypass additionally bypassing a Forward-Error-Correction processing function in the first and second transponders, depending on a signal condition of the received optical signal.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
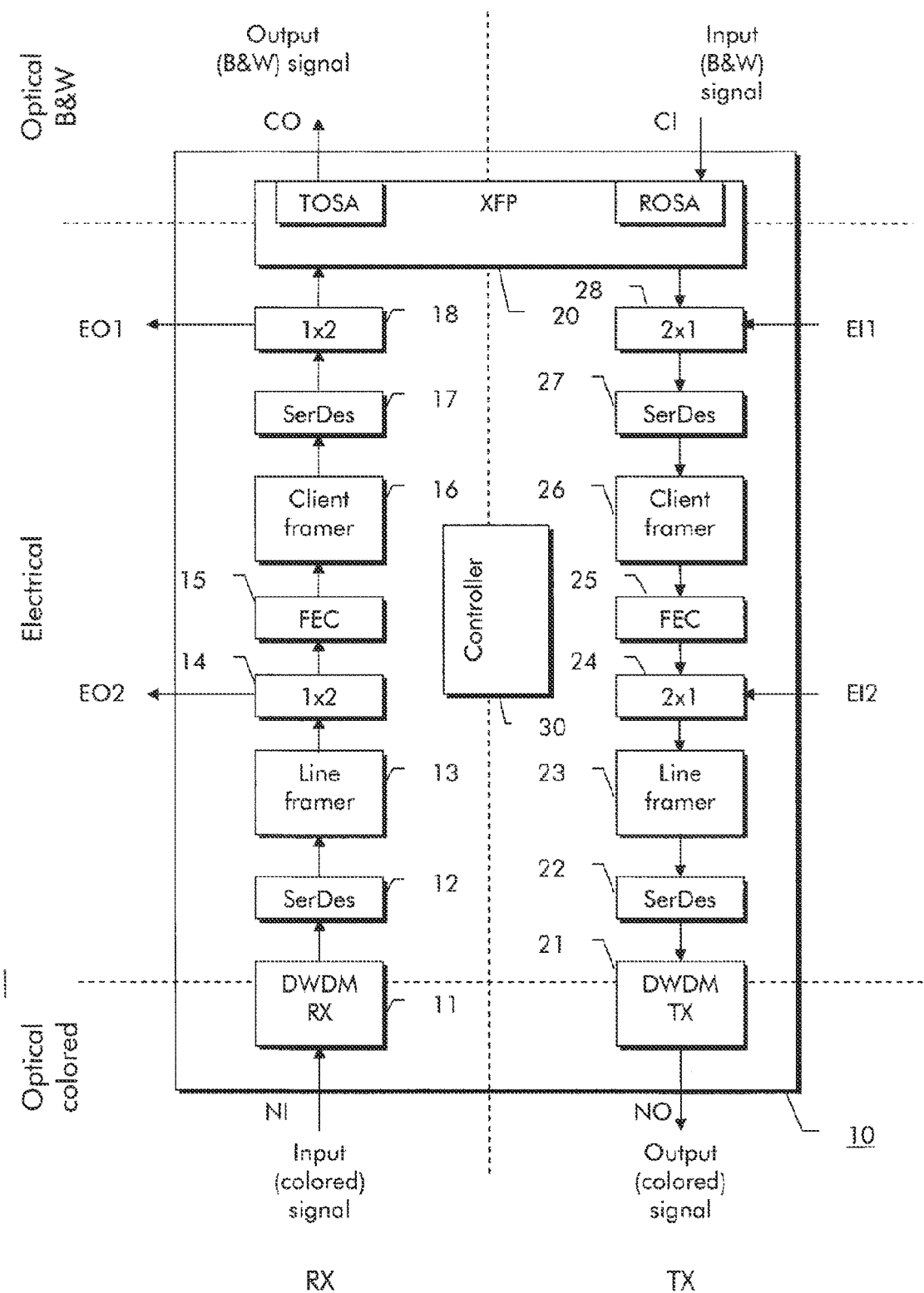
FIG. 1 shows a transponder for a network node of an optical transmission network.

A transponder 10 for an optical network node is shown in FIG. 1. An optical transponder is a piece of equipment that receives an optical signal, then processes and re-transmits it on a new wavelength, which can be different from the received wavelength. The transponder can be used for example as part of a line card in an optical network node.

The transponder or line card 10 in FIG. 1 operates bidirectionally, i.e. receives and transmits signals in both directions. At the bottom of FIG. 1 are network side input and output ports NI, NO and at the top are customer side input and output ports CI, CO. With regard to its network side functionality, the two independent transponder directions are referred to as receiver portion RX and transmitter portion TX. In particular, the receiver portion RX of transponder 10 shown at the left-hand side of FIG. 1 contains a DWDM (dense wavelength division multiplex) optical receiver circuit 11, which receives a single DWDM wavelength channel and converts the received optical signal into an electrical signal. The electrical signal is fed to a serial to parallel converter 12, which is connected to a line framer 13. After the line framer follows a FEC (forward error correction) processor 15, which leads to a client framer 16 from which the signal is connected via a parallel to serial converter 17 to a transmitter function TOSA (transmitter optical sub-assembly) of an XFP (10 Gigabit Small Form Factor Pluggable) transceiver 20. A controller 30 configures and controls the various functional blocks of the transponder 10 and communicates with a superordinate controller of a network node that accommodates transponder 10.

In the transmit direction TX, shown on the right-hand side of FIG. 1, an optical client signal received at customer side input port CI is converted by the receiver optical sub-assembly ROSA of XFP transceiver 20 into an electrical signal. A serial to parallel converter 27 converts the electrical signal to a parallel format for further processing. The parallel signal is then fed to a client framer 26, which connects to a FEC processor 25. Behind the FEC processor follows a line framer 23 and a parallel to serial converter 22, which connects to a DWDM optical transmitter circuit 21.

In the receiver portion RX, the line framer 13 terminates and processes the signal overhead of received optical signals. The received signal can for example have a frame format in accordance with the OTN standards (ITU-T G.709). The FEC processor processes the FEC bytes within the received signal to detect and correct errors in the received signal due to signal distortions that occurred during transmission. The client framer processes the signal headers of the client signal, which is transported as payload within the received line signal. The client signal format can be for example an Ethernet frame format.

In the transmitter portion TX, the client framer processes signal headers of the client signal format. FEC processor 25 calculates and adds FEC bytes, and line framer 22 maps the client signal format into signal frames of the line signal format, e.g. OTU2 frames in accordance with the OTN standard.

The transponder further contains in the receiver portion RX an 1×2 switch 18 connected before the TOSA of XFP 20, which allows to output at an electrical output EO1 an electrical client signal instead of (or in addition to) an optical client signal at customer side output CO. Likewise, a 2×1 switch 28 is provided behind the ROSA of XFP 20 in the transmitter portion, which allows to supply via an electrical input EI1 an electrical client layer signal, instead of an optical one at customer side input CI.

Moreover, a second 1×2 switch 14 is provided in the receiver portion RX in front of FEC processor 15, which allows to extract at an electrical signal output EO2 an E/O converted line signal prior to FEC processing. In the transmitter portion TX, a second 2×1 switch 24 is provided, which allows to feed an electrical line signal to the transponder 10.

These first 1×2 and 2×1 switches 18, 28 allow to bypass the customer side E/O and O/E functionality (the XFP in this embodiment) of transponder 10. The second 1×2 and 2×1 switches 14, 24 allow to bypass also the receive and transmit side FEC processors 15, 25, when FEC processing would not be required due to low signal distortions. Switches 14, 24, 18, 28 are switched under control of controller 30. Further, controller 30 acts to selectively activate and deactivate FEC processors 15, 25 and/or customer side E/O and O/E functionality when bypassed.

An optical regenerator function can be implemented by connecting two transponders back to back. So, with a conventional transponder, a regenerator could be implemented by connecting the optical client side output of a first line card to the optical client side input of a second line card or of the same line card back to back.

Embodiments of the present invention add electrical outputs in line cards at selected locations within the line card to by-pass functionality and components when not used, and switch off by-passed line card components. Such components that can be switched off when performing a back-to-back regeneration are the client side TX/RX modules, e.g. an XFP, and the FEC processors. Line cards hence have two outputs: the regular client port which forms an optical output and at east one additional electrical output that is used to bypass the FEC or the client side TX/RX modules. This second output enables dynamic regeneration: a combination of two line cards can be used as a standard regeneration device as before, or as a low-energy regeneration device when FEC and/or client side TX/RX modules are bypassed.

When a light path is established in an optical network, its quality of transmission (QoT) shall remain within a predefined range. If the QoT is estimated to be too low, then a regenerator needs to be placed on the light path to improve the signal's QoT. Regeneration can be implemented by combining two line card ports back-to-back to implement what is referred to as "OEO" (opto-electro-opto) regeneration scheme.

In some instances the distance to transmit the signal after regeneration will be shorter than the transparent reach of a signal, hence after regeneration the signal will arrive to the destination node with a QoT value which is higher than the target. In such instances, a "lighter" regeneration process as described above will enable to reach the destination node with a QoT-value higher than the threshold but lower than the QoT obtained with a full OEO regeneration.

Figure 2:
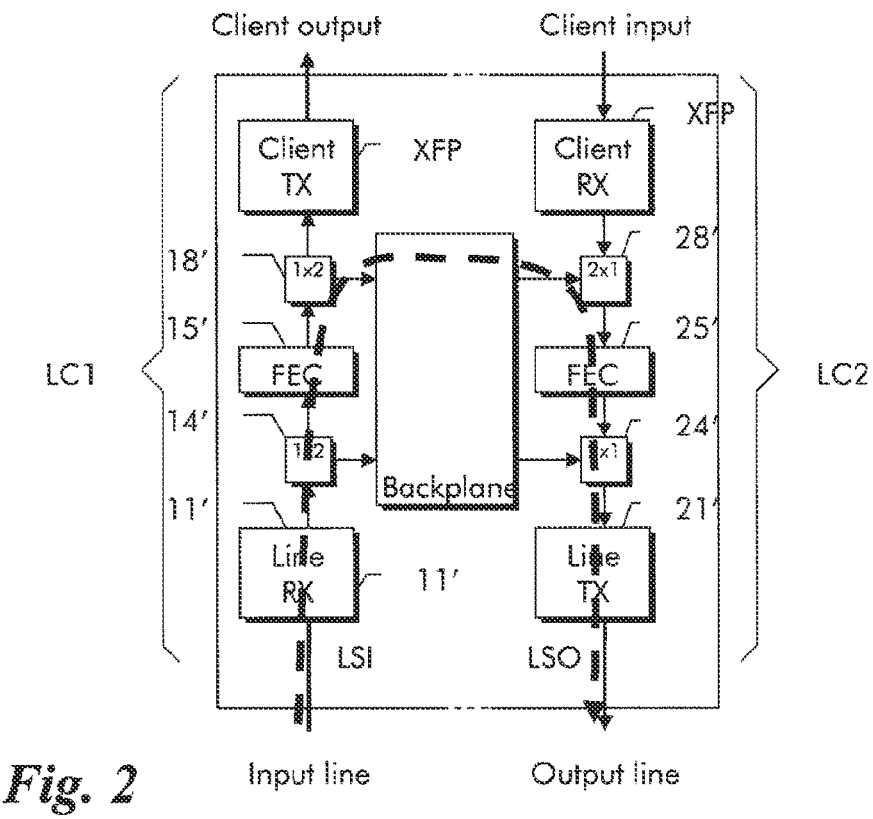
FIG. 2 shows signal regeneration, which are connected over a second addition electrical output to perform signal regeneration without E/O conversion.

FIG. 2 shows an embodiment, where two line cards are used to regenerate a line signal. The incoming line signal LSI is received at the receive side of a first line card LC1 and O/E converted to an electrical signal. The electrical signal is FEC processed to correct any errors in the signal. The processed signal is then extracted through 1×2 switch 18' and fed via an internal switched backplane connection to a the transmit side of a second line card LC2. A 2×1 switch 28' couples the electrical signal to a FEC processor 25' of the transmit function. After FEC processing to add new FEC overhead, the line signal is E/O converted through the line transmitter 21' and sent as a recovered optical line signal LSO back to the network.

As can be seen from FIG. 2, rather than connecting the client side optical outputs and inputs of line cards LC1, LC2, a bypass through switches 18', 28' is implemented, which circumvents the E/O and O/E conversion at the client side. The client side XFP can hence be deactivated to reduce power consumption of the line cards.

Figure 3:
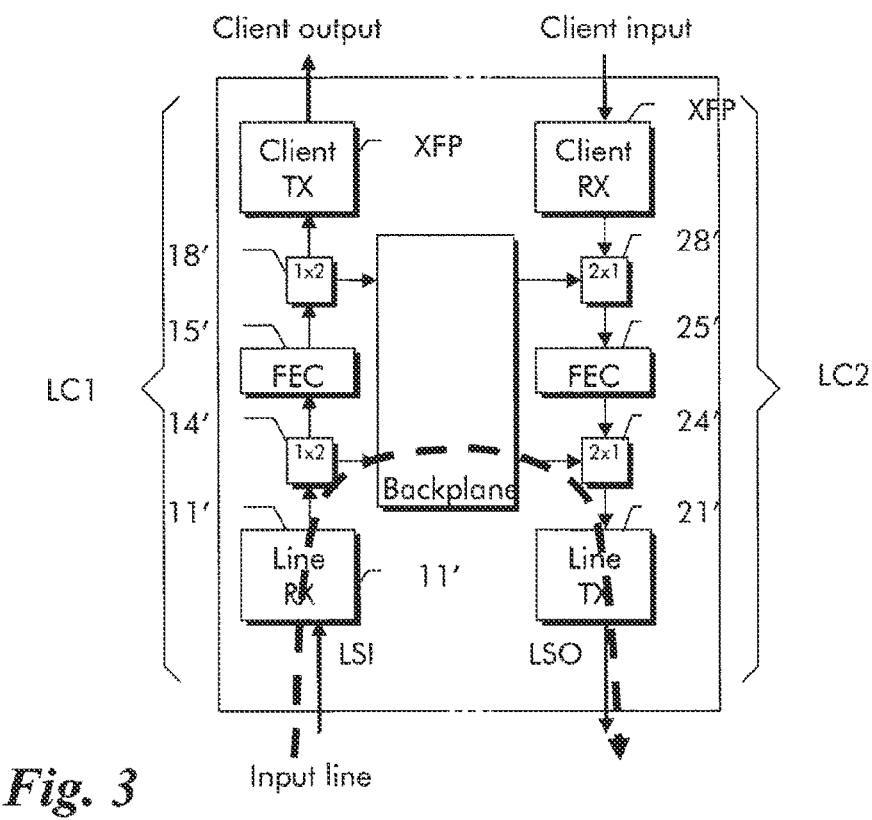
FIG. 3 shows two transponders, which are connected over a first addition electrical output to perform signal regeneration without FEC processing.

In FIG. 3, a second embodiment of a regenerator configuration is shown. Instead of going through FEC processors 15', 25', an electrical signal is extracted through 1×2 switch 14' and fed over an internal backplane connection to 2×1 switch 24' of the transmit side of second line card LC2. Switch 24' couples the electrical signal to line transmitter 21' of line card LC2, where it is E/O converted and sent as a recovered line signal back to the network.

In the second embodiment, switches 14', 24' serve to bypass also the FEC processors 15', 25', which hence can be deactivated to further reduce power consumption. This second configuration can be chosen when an optical line signal needs regeneration through O/E/O conversion, but has not experienced too much distortion, so that FEC processing is not yet required and can be deferred to network equipment downstream the transmission path.

Hence, depending on which signal bypass is activated, controller 30 deactivates either the E/O/E functionality of XFP 20, or deactivates in addition the FEC processors 15, 25 in either signal path.

It should be understood that the regenerator configuration can but does not necessarily need to be implemented using receiver and transmitter sections of different line cards. It would equally be possible to short the electrical inputs and outputs of the receiver and transmitter sections on a single line card.

It should further be understood that FIGS. 2 and 3 are simplified, schematic drawings, which represent only functions of interest here such as client side TX/RX, network side TX/RX, OE and EO conversions, and FEC, while other functional blocks, which would be present and required on a real line card are omitted for the sake of lucidity.

Figure 4:
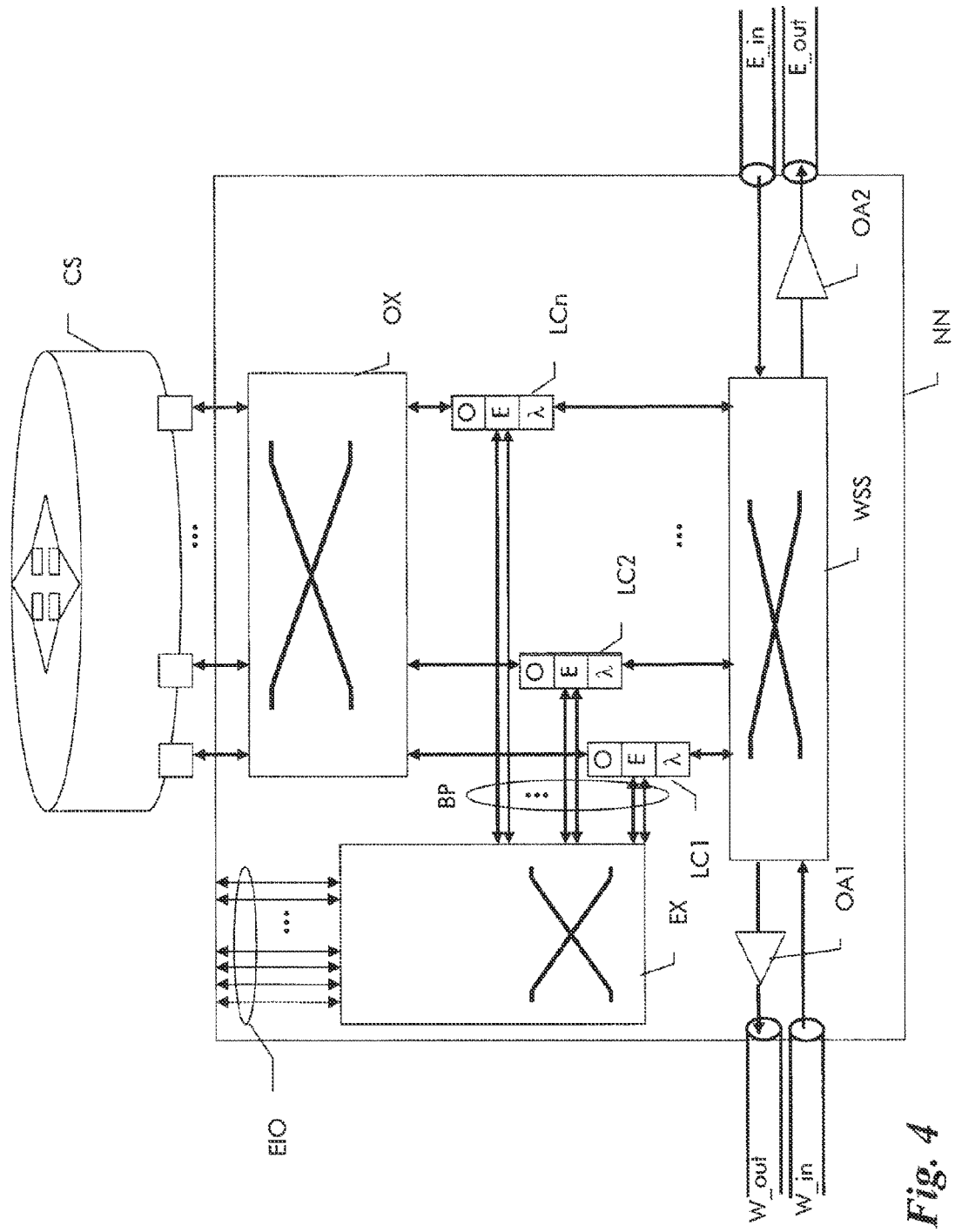
FIG. 4 shows a network node for an optical transmission network.

FIG. 4 shows an optical network node NN, which in this embodiment is an optical add/drop multiplexer. The network node 40 has connectors for two fibers in each direction (east and west) of a ring network, in particular east and west inputs and outputs for fibers E_in, W_in, E_out, W_out, respectively. The four fibers E_in, W_in, E_out, W_out carry DWDM signals with a number of wavelength channels. An optical switch matrix WSS, based on wavelength selective switches for example, interconnects the four fibers and provides a number of n tributary inputs and outputs for add and drop signals on any wavelength channels to and from the ring and transparently switch transit traffic from input to output ring fibers. Optical amplifiers OA1, OA2 are provided at the output side of the ring interfaces.

Each tributary input and output is equipped with a line card LC1-LCn of the type shown in FIG. 1. The wavelength selective switch WSS adds and drops single wavelength signals to and from either of the east and west fibers. Each of the line cards LC1-LCn has a network side optical section λ for single wavelength signals, an electrical section E for electrical signal processing and reshaping, and a client side optical section O providing short range optical interfaces to and from client equipment.

For further flexibility, an optional optical space switch matrix OX can be provided between client side fiber terminals and line cards LC1-LCn. Switch matrix OX can be implemented for example using optical MEMS (Micro-electromechanical systems) technology, i.e. a technology that embeds mechanical devices such as micro mirrors, actuators, etc.

An external client switch or router CS is shown connected to the optical tributary ports of the network node. Such client switch or router will perform layer 2 or 3 switch functions on the client signals transported through the WDM network. Typically, the wavelengths of the client signals are in the 1300 nm range, that is used for short range optical interfaces, while the wavelengths on the WDM network are in the 1500 nm range used for long-haul transmission and DWDM multiplexing.

The line cards LC1-LCn have at their electrical section E intermediate electrical inputs and outputs as described above. These intermediate inputs and outputs are connected through a backplane BP to an electrical space switch matrix EX, such as for example a crosspoint switch. Switch matrix EX allows to switch bypass connections between arbitrary line cards to implement signal regeneration as needed. Further, a number of electrical input and outputs ports EIO can be provided, via which electrical signals can be received and transmitted from and to client network equipment. It would be understood by those skilled in the art in this context, that electrical signals added and dropped through electrical input and outputs ports EIO would require FEC processing independent of the signal distortions, as they will enter/leave the network. Hence electrical add/drop traffic would go to/come from intermediate ports 28 and 18 in FIG. 1, rather than to/from intermediate ports 24 and 14, respectively.

The activation and set-up of regenerator configurations in either mode should be up to a management plane or a control plane of the network. The backplane switch EX enables two kinds of regeneration, each associated with a different power saving and signal reach. Control plane signaling based on a control plane protocol such as the GMPLS protocol suite can support the configuration of the network node. A new GMPLS field or command can specify the type of required regeneration, e.g. full or partial regeneration and the associated reach.

The electrical section of the line cards can further contain electrical filters such as linear equalizers or decision feedback equalizers for compensating dispersion effects in the optical domain. It can also contain sampling circuits, ADCs and digital signal processors for recovering the original data signal, using for instance of a coherent receiver architecture. Depending on the amount of distortion in the received optical signal, such additional reshaping or compensation means can also be bypassed in the way described before.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An optical network node comprising two or more line cards, each line card comprising a receive side optical transponder section comprising a network side optical receiver for single wavelength optical signals, a first electrical section, and a client side optical transmitter and a transmit side optical transponder section comprising a network side optical transmitter for single wavelength optical signals, a second electrical section, and a client side optical receiver, wherein said first electrical section comprises at least one intermediate electrical output and wherein said second electrical section comprises at least one intermediate electrical input; said optical network node further comprising an electrical switch matrix for controllably interconnecting one of said at least one intermediate electrical output of a first line card and one of said at least one intermediate electrical input of said first line card or a second line card;

wherein said first electrical section comprises a first Forward Error Correction processor and second electrical section comprises a second Forward Error Correction processor and wherein said at least one intermediate electrical output comprises a first electrical output connected between said first Forward Error Correction processor and said client side optical transmitter, and a second electrical output connected between said network side optical receiver and said first Forward Error Correction processor, and wherein said at least one intermediate electrical input comprises a first electrical input connected between said client side optical receiver and said second Forward Error Correction processor, and a second electrical input connected between said second Forward Error Correction processor and said network side optical transmitter; further comprising a controller adapted to implement a regenerator function by configuring said electrical switch matrix to activate either a bypass connection between said first electrical output and said first electrical input or a bypass connection between said second electrical output and said second electrical input, depending on a signal condition of a received optical signal.

2. An optical network node according to claim 1, wherein said controller is adapted for deactivating said client side optical transmitter and said client side optical receiver if a bypass connection between said first intermediate electrical output and said first intermediate electrical input is activated.

3. An optical network node according to claim 1, wherein when a bypass connection between said second intermediate electrical output and said second intermediate electrical input is activated, said controller is adapted to deactivate said client side optical transmitter, said client side optical receiver, and said first and second Forward Error Corrections processors.

4. A method of regenerating a single wavelength optical signal using two optical transponders each having an optical receiver, an electrical section for processing and/or reshaping said electrical signal, and an optical transmitter, the method comprising:

receiving said single wavelength optical signal at a first optical transponder comprising a network side optical receiver, a first electrical section having an intermediate electrical output, and a client side optical transmitter;

converting within said first optical transponder said optical signal to an electrical signal;

bypassing said electrical signal through said intermediate electrical output to an intermediate electrical input of a second optical transponder, the second optical transponder having a network side optical transmitter, a second electrical section with said intermediate electrical input, and a client side optical receiver;

converting at said second optical transponder said electrical signal to a single wavelength optical signal for onwards transmission; and selecting between configuring a first bypass bypassing an electro-optical conversion in said first optical transponder and an opto-electrical conversion in said second optical transponder and configuring a second bypass further bypassing a Forward-Error-Correction processing function in said first and second optical transponders, depending on a signal condition of the received optical signal.

* * * * *